Sept. 11, 1945.  T. H. SLOAN  2,384,498
GLASS FORMING MACHINE
Filed Sept. 3, 1938  8 Sheets-Sheet 1

INVENTOR.
Theodore H. Sloan
BY William B. Jaspert
ATTORNEY.

Sept. 11, 1945.  T. H. SLOAN  2,384,498
GLASS FORMING MACHINE
Filed Sept. 3, 1938  8 Sheets-Sheet 2

INVENTOR.
Theodore H. Sloan
BY William B. Jaspert
ATTORNEY.

Sept. 11, 1945.　　　T. H. SLOAN　　　2,384,498
GLASS FORMING MACHINE
Filed Sept. 3, 1938　　　8 Sheets-Sheet 3

INVENTOR.
Theodore H. Sloan
BY William B. Jaspert
ATTORNEY.

Sept. 11, 1945.   T. H. SLOAN   2,384,498
GLASS FORMING MACHINE
Filed Sept. 3, 1938   8 Sheets-Sheet 4

INVENTOR.
Theodore H Sloan
BY William B. Jaspert
ATTORNEY.

Sept. 11, 1945.　　　T. H. SLOAN　　　2,384,498
GLASS FORMING MACHINE
Filed Sept. 3, 1938　　　8 Sheets-Sheet 5

Fig. 11

INVENTOR.
Theodore H. Sloan
BY William B. Jaspert
ATTORNEY.

Sept. 11, 1945.  T. H. SLOAN  2,384,498
GLASS FORMING MACHINE
Filed Sept. 3, 1938  8 Sheets-Sheet 6

INVENTOR.
Theodore H. Sloan
BY William B. Jaspert
ATTORNEY.

Patented Sept. 11, 1945

2,384,498

UNITED STATES PATENT OFFICE 2,384,498

GLASS FORMING MACHINE

Theodore H. Sloan, Charleroi, Pa., assignor to G. M. S. Corporation, Pittsburgh, Pa., a corporation of Pennsylvania Application September 3, 1938, Serial No. 228,337

9 Claims. (Cl. 49—9)

This invention relates to improvements in ware forming machines employing twin cooperative rotary tables of the type in which a series of parison molds are mounted on one table and a series of blow molds are hinged on the other table.

It is among the objects of the invention to provide an improved drive for each table which inherently embody means for positively indexing and locking said tables in cooperative relation, thereby minimizing the time lapse between index and working of the molds, said drives being operated from a single source of power whereby all the working operations for receiving the glass and transferring the ware is done while the tables are rigidly held in locked position.

A further object of the invention is to provide means for varying the ratio between the index and dwell periods of the drive mechanism whereby to increase the efficiency of the ware forming machine by reducing the dwell or work time and increasing the index time, without varying the cycle or speed of the machine, and further to provide means to accomplish such adjustment of both drives simultaneously.

A further object of the invention is the provision of means for applying power from a single source to the operating parts of the ware forming machine and to the glass feeding apparatus and to provide simple and efficient means for operating the feeder or forming machine drives independently or in synchronism.

Another object of the invention is to provide an improved timer mechanism for controlling the various operations of the blow heads and transfer mechanisms.

Still a further object of the invention is the provision of means for disconnecting the machine drive when the operations of the mold opening and closing mechanisms are for any reason incompleted.

Still a further object of the invention is the provision of means for maintaining continuous blowing pressure on the ware during the dwell and index periods of the finish molds.

These and other objects of the invention will become more apparent from a description of the accompanying drawings constituting a part hereof in which like reference characters designate like parts and in which:

Figure 1:
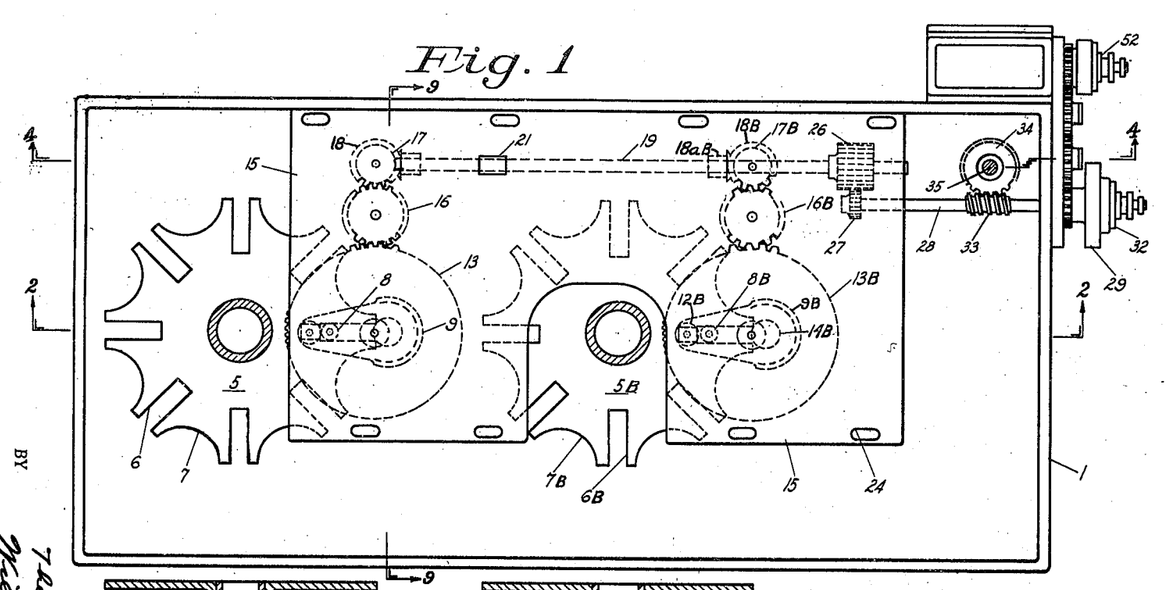
Fig. 1 is a top plan view of the machine base showing a twin-table drive.
Figure 2:
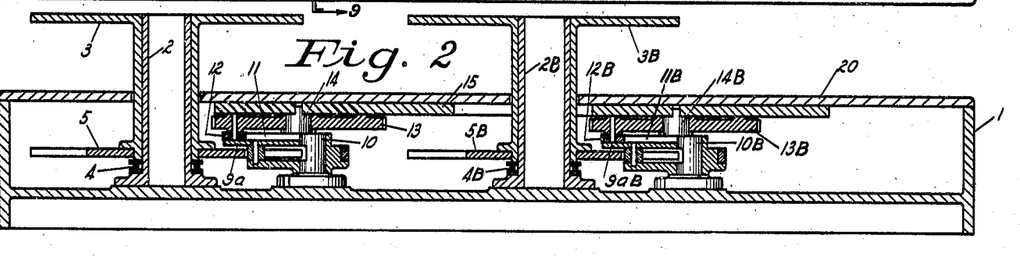
Fig. 2 a vertical section taken along the line 2—2, Fig. 1.

With reference to Figs. 1 and 2 of the drawings, the structure therein illustrated comprises a base 1 having upright journal columns 2 and 2B on which are mounted tables 3 and 3B which are supported on anti-friction bearings 4 and 4B. Attached to the journals of the tables 3 and 3B are Geneva plates 5 and 5B which rotate with the tables, each plate being provided with radial slots 6 and 6B and concentric concave surfaces 7 and 7B for engagement with rollers 8 and 8B and the concentric lobes 9 and 9B, respectively, of driver arms 9a and 9aB. The driver arms 9a and 9aB are journaled on the stud shafts 10 and 10B which are mounted on the base 1 in fixed relation to the table columns 2 and 2B. The driver arms are further provided with slots 11 and 11B which are engaged by a roller or guide blocks 12 and 12B mounted on gears or bull-wheels 13 and 13B that are journaled on the stud shafts 14 and 14B suspended from an adjustable plate 15, the bull-wheels 13 and 13B being driven through gear wheels 16 and 16B by pinions 17 and 17B, the latter being integral with the respective beveled gears 18 and 18B which in turn are in mesh with the beveled gears 18a and 18aB that are driven by the drive shaft 19, Figs. 1 and 4. The plate 15, by which the gear wheels 13 and 13B are suspended, is adjustable to vary the axial position of the stud shafts 14 and 14B relative to the shafts 10 and 10B, Fig. 2, whereby the position of the guide blocks 12 and 12B on the Geneva drive arms 9a and 9aB are varied for purposes to be hereinafter explained.

Figure 4:
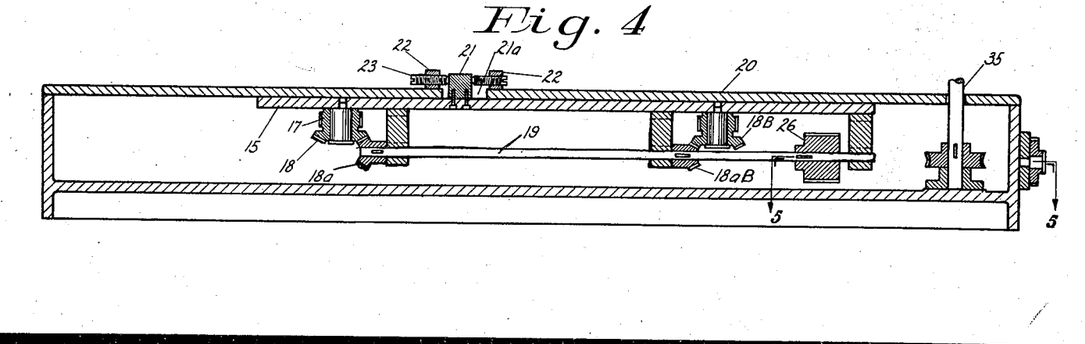
Fig. 4 a vertical section of a portion of the table base and drive taken along the line 4—4, Fig. 1.
Figures 8, 9, 10:
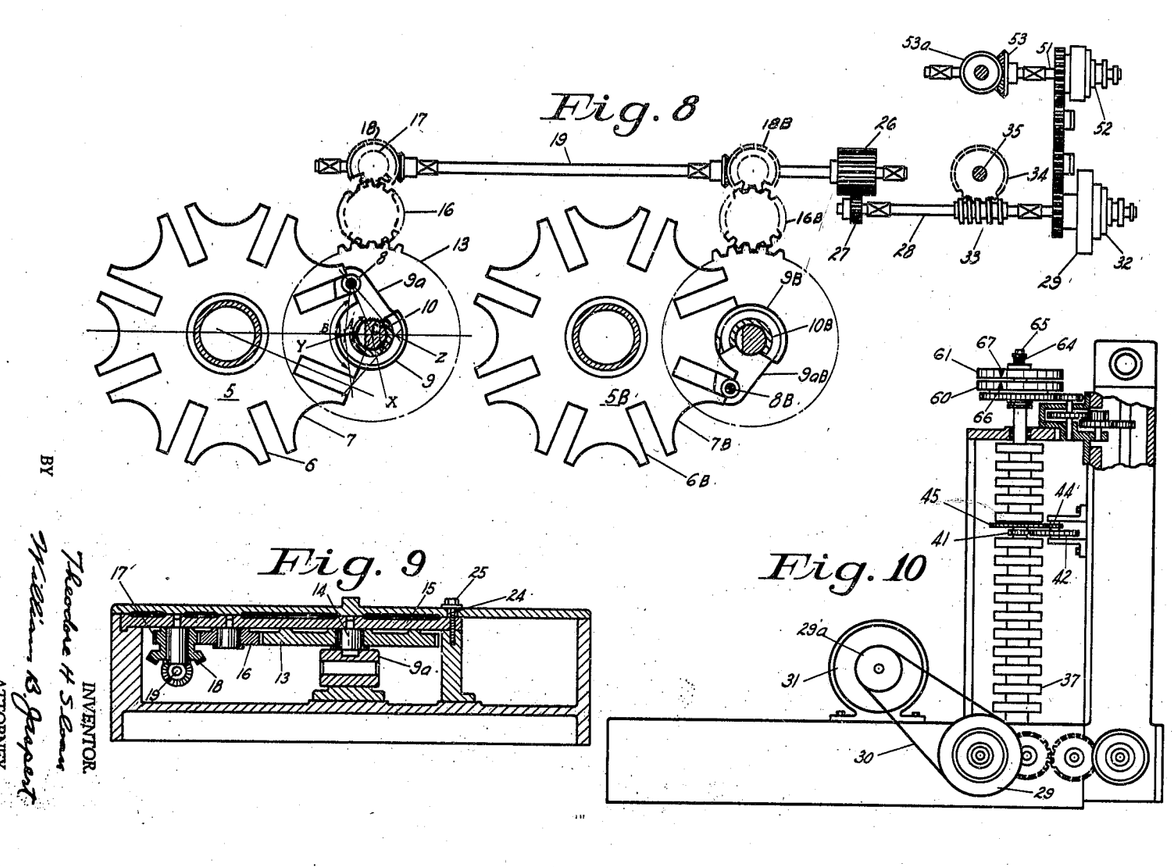
Fig. 8 a top plan view diagrammatically illustrating the twin table drive.
Fig. 9 a transverse section taken on the line 9—9, Fig. 1.
Fig. 10 a side elevation partially in section of the timer and feeder drive.

To effect the adjustment of the suspension plate 15 relative to the cover plate 20, a lug 21, Figs. 1 and 4, is secured to the suspension plate 15 to extend through a slotted opening 21a in the cover plate in alignment with lugs 22 provided on the latter. Adjusting screws 23 permit movement of the lug 21 and the suspension plate 15 which changes the relative axial position of stud shafts 14 and 14B relative to the stub shafts 10 and 10B. As shown in Fig. 1, the suspension plate 15 is provided with elongated openings 24 through which clamping bolts 25 are extended from the cover 20 as shown in Fig. 9 of the drawings. By drawing up the bolts 25, the suspension plate 15 and cover 20 are securely locked to the position in which the plate has been adjusted.

By means of the above-described mechanism, the twin tables are subjected to positive indexing movement without lost motion, which permits constant alignment of their cooperating parts as, for example, superposed position of the mold, neck ring and finish blow mold, as will be hereinafter explained, thereby eliminating bending and surface cracking of bottle necks and the imposition of strain on the ware. This positive indexing movement also eliminates shimmying between the two tables, which would necessitate retardation of the ware transfer operation until the tables have come to rest.

Also the positive drive of the indexing movement of the two tables will eliminate loss of time of molds coming to rest and during the dwell periods the twin tables are positively locked in their indexed position while the successive parison-forming and final blowing operations take place. The structure of the variable Geneva drive for each table is the same and reference is made to the parison table structure. With reference to Figs. 2 and 8 of the drawings, the normal ratio of a Geneva drive is obtained when the centers of the stud shafts 10 and 14 are in coaxial alignment. To increase the index time and reduce the dwell time, the centerline of the stud 14 is changed from the X or normal alignment position to the Y position, Fig. 8, the Y position being that shown in Fig. 2 of the drawings with the bull-wheel stud shaft 14 to the left of the centerline of shaft 10, as viewed from the base of Fig. 2. This adjustment causes bull-gear 13 to act upon a Geneva drive arm 9a through guide block 12 through the angle B, Fig. 8, which is greater than the normal angle A. To decrease the index time and increase the dwell time, the center of stud shaft 14 is shifted relative to the center of the shaft 10 to the Z position by the adjustment of the screws 23, Fig. 4 of the drawings, this adjustment causing driver 12 of the bull-gear 13 to act on the Geneva drive 9a through the angle C, which is less than the normal angle A. The roller 8 of the drive arm rotates about the fixed axis of the shaft 10 and enters and leaves the slots 6 of the Geneva at the same points. The pivoted guide block 12 rotates about the movable or independent axis of the bull-wheel shaft 14 and revolves about the fixed axis of the shaft 10. Thus the pivot of the guide block 12 is located at the intersection of its selected rotary path with the radius drawn from the axis of the shaft 14, in a selected position, to the point where the roller 8 enters or leaves the slots 6 of the Geneva. Obviously the location of the guide block pivot changes when the shaft 14 is shifted to another selected position relative to the shaft 10 but the path of the roller 8 is fixed.

*Forming machine and feeder drives and master timer mechanisms*

Figure 3:
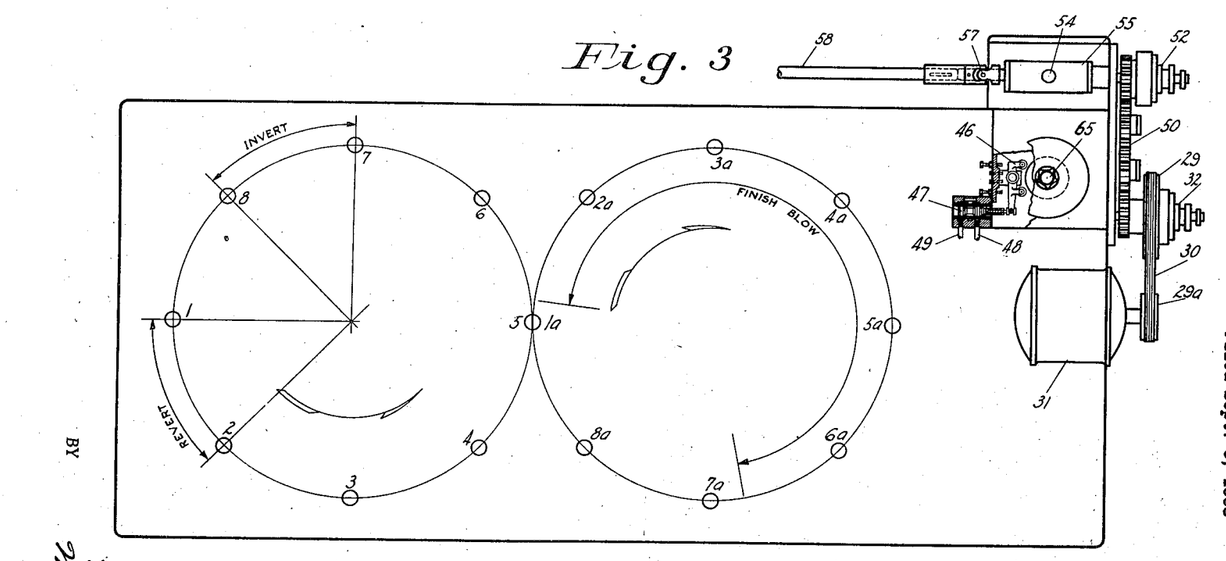
Fig. 3 a view diagrammatically illustrating the twin tables and machine base with the timer and feeder drives shown in plan partially in section.
Figure 5:
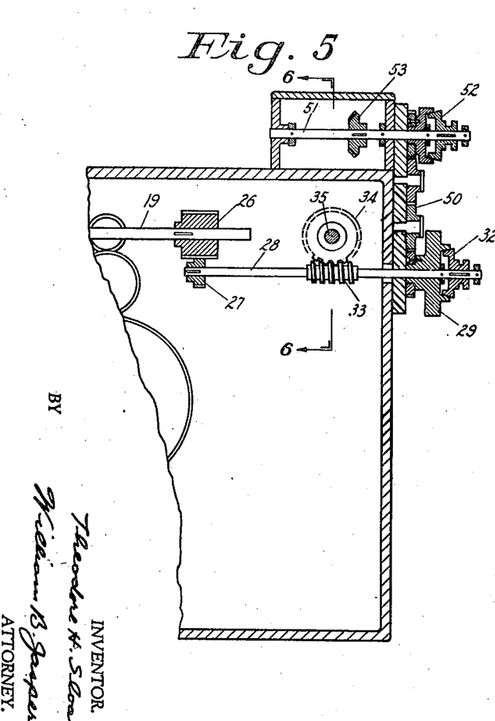
Fig. 5 a longitudinal section of the table, timer and feeder drive taken along the line 5—5, Fig. 4.

The drive shaft 19 is actuated by a gear wheel 26, Figs. 1, 5 and 8, driven by a pinion 27 from the main drive shaft 28 that is provided with a flywheel pulley 29, Fig. 5, driven by the pulley 29a and an endless belt 30 of a motor 31, Figs. 3 and 10. A clutch 32, Fig. 5, effects engagement and disengagement of the drive shaft 28 with the flywheel pulley 29. It will be seen in Fig. 5 that the gear wheel 26 is provided with a relatively wide face within the limit of adjustment of the suspension plate 15 to maintain its contact with the pinion 27 for any adjusted position of the suspension plate 15.

Figure 6:
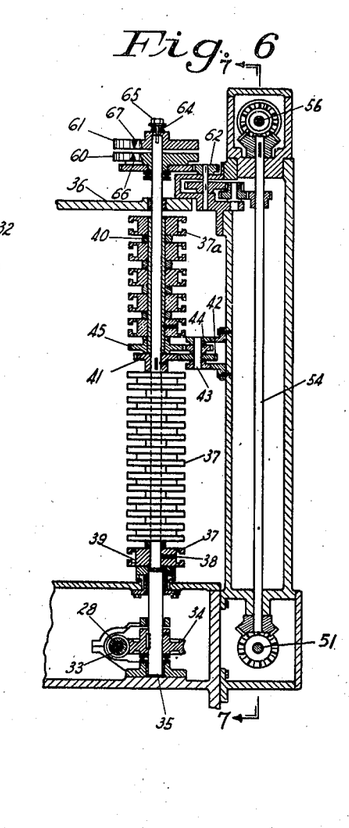
Fig. 6 a vertical section partially in elevation of the timer and feeder drive taken along the line 6—6, Fig. 5.

Drive shaft 28 is provided with a worm 33 which engages a worm wheel 34 of a timer shaft 35, Figs. 5 and 6. Timer shaft 35 extends vertically above the machine housing 36 and a series of cam holders 37 are secured by set screws 38 to the lower half of the timer shaft, the cam holders being provided with T-slots 39 for receiving cam lobes which are secured therein. A sleeve 40 is journalled on the upper portion of the timer shaft 35 to carry a series of similar cam holders 37a. The cam holders mounted on sleeve 40 are rotated at a reduced speed through a change gear wheel 41 that is keyed to the timer shaft 35 and which interacts with a gear wheel 42 on a stud shaft 43, a gear wheel 44 being provided to interact with the teeth of a gear wheel 45 that is mounted to rotate the sleeve 40.

The cams of the timer shaft are adapted to actuate rocker arms 46, Fig. 3, which actuate spool valves 47 that control the application of positive and negative air pressure through conduits 48 and 49, Fig. 3, which lead to the cylinders and actuators of the blow heads and transfer mechanism of the molds hereinafter described. The cams on the shaft 35 and sleeve 40 operate at different speeds and control the different operating parts functioning at different speed ratios, as for example, the ware take-out mechanism.

Figure 7:
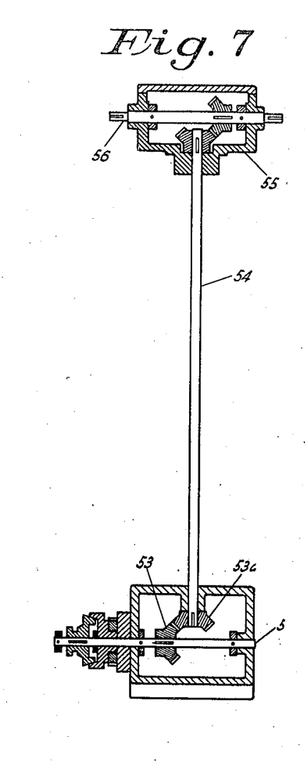
Fig. 7 a vertical section of the feeder drive taken along the line 7—7, Fig. 6.

As shown in Figs. 5 to 7 of the drawings, the main drive is geared through idler wheels 50 to the feeder drive shaft 51 which is provided with a clutch 52 permitting disengagement of the feeder mechanism and the ware forming machine drive. By means of the clutches 32 and 52, the feeder may be operated independently of the forming machine or the latter may be operated independently of the feeder. The feeder drive shaft 51 is connected by miter gears 53—53a to a shaft 54, Fig. 7, the opposite end of which is provided with a beveled gear drive contained in a housing 55, Figs. 3 and 7, which housing may be turned through an angle of 180° in which position shaft 56 will revolve in the opposite direction when viewed from the same side of the machine and accordingly drive the feeder in the reverse direction if the circumstances so require. The drive shaft 56 is mounted in the housing 55 and is connected by a universal joint 57 to the feeder shaft 58, Fig. 3.

The table and timer mechanisms are directly connected by gearing as heretofore explained. Since, however, the feeder and forming machine drives may be separately operated, provision is made to synchronize their movements by means of the following mechanism. As shown in Figs. 6 and 10 a pair of disks 60 and 61 are mounted at the upper end of timer shaft 35. Disk 60 is journalled for rotation independently of shaft 35 and is actuated by a gear reduction mechanism generally designated by numeral 62, which is driven by shaft 54 of the feeder drive. Disk 61 is frictionally engaged by spring 64 to rotate with the timer shaft 35, tension of the spring being adjustable by cap screw 65. The gear reduction mechanism 62 is of a ratio to rotate the disk 60 at the same speed and direction as the disk 61 and by manipulation of clutch 32 of the machine drive, the latter may be brought into adjusted operative driving relation to the feeder drive when the targets 66 and 67 of disks 60 and 61 are in register as shown in Figs. 6 and 10. Such adjustment occurs, for example, in normal operation when the machine drive is declutched to change molds, while the feeder continues to operate to maintain proper condition of glass.

*Mold operating parts and safety devices*

Figure 12:
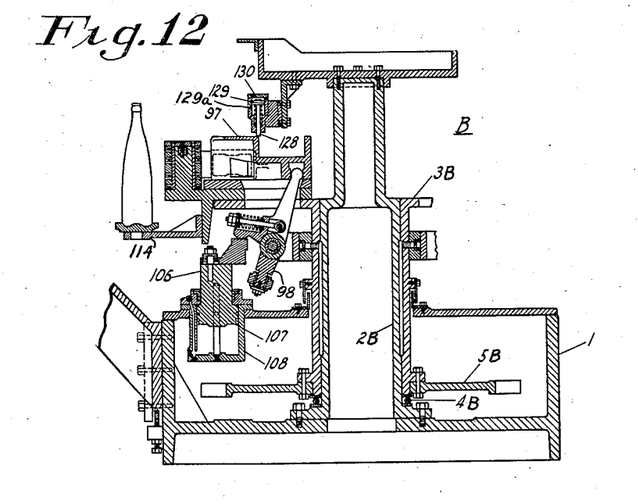
Fig. 12 a vertical section of the ware forming machine at the take out position.
Figure 13:
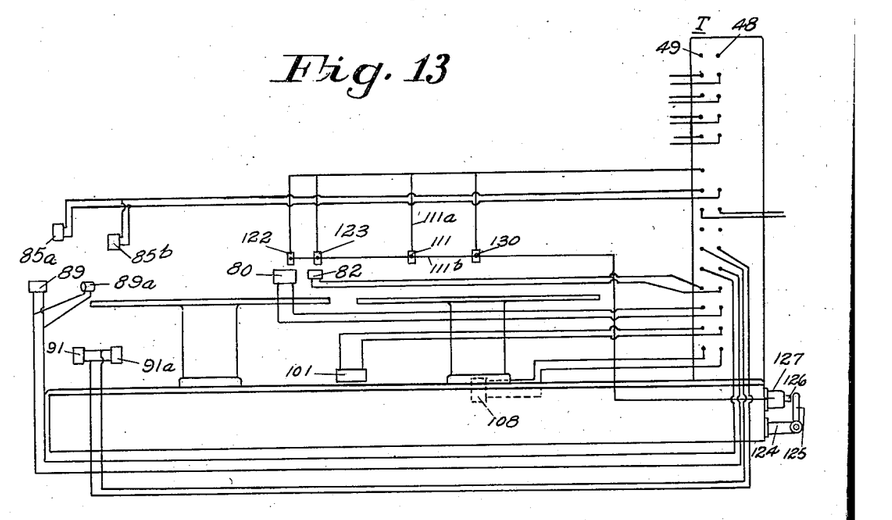
Fig. 13 a diagram of the fluid pressure mechanism controlling the operations of the ware-forming machine.
Figure 14:
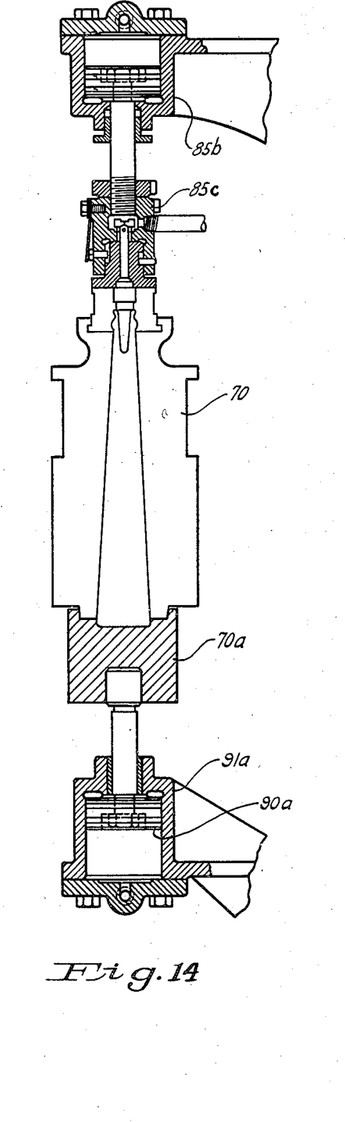
Fig. 14 a vertical section of a parison mold with the bottom plate and blow head actuating mechanism.
Figure 15:
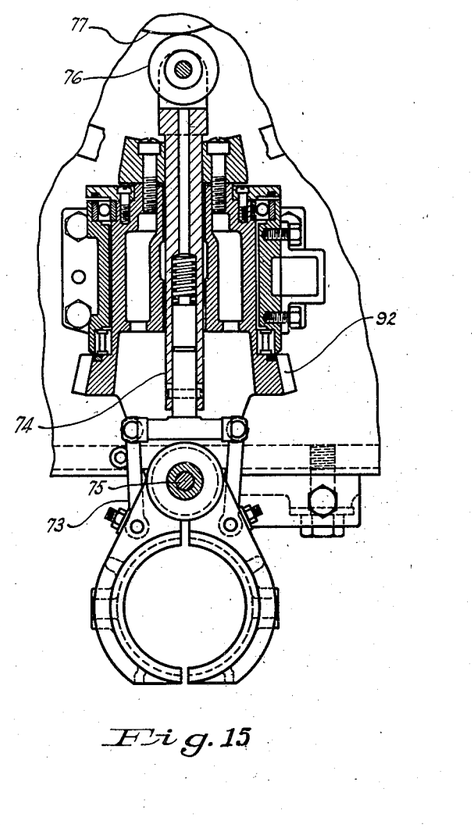
Fig. 15 a plan view of a parison mold opening and closing mechanism partly in section.
Figure 16:
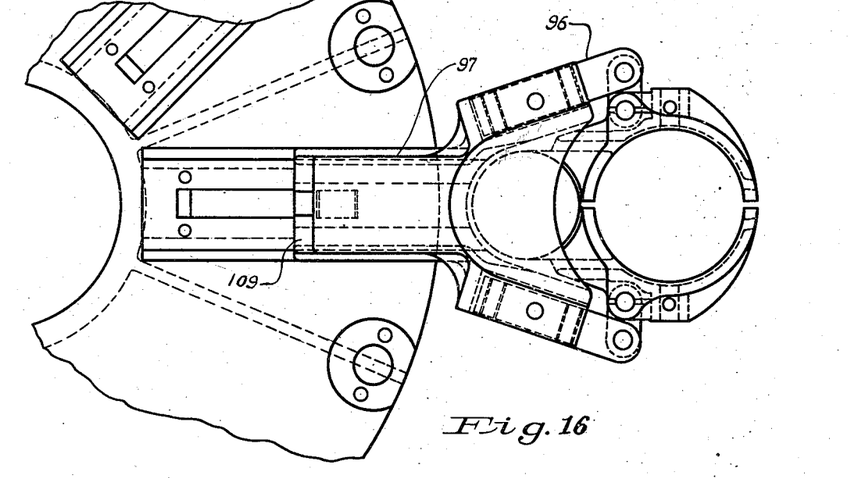
Fig. 16 a top plan view of the finish blow mold opening and closing mechanism.
Figure 17:
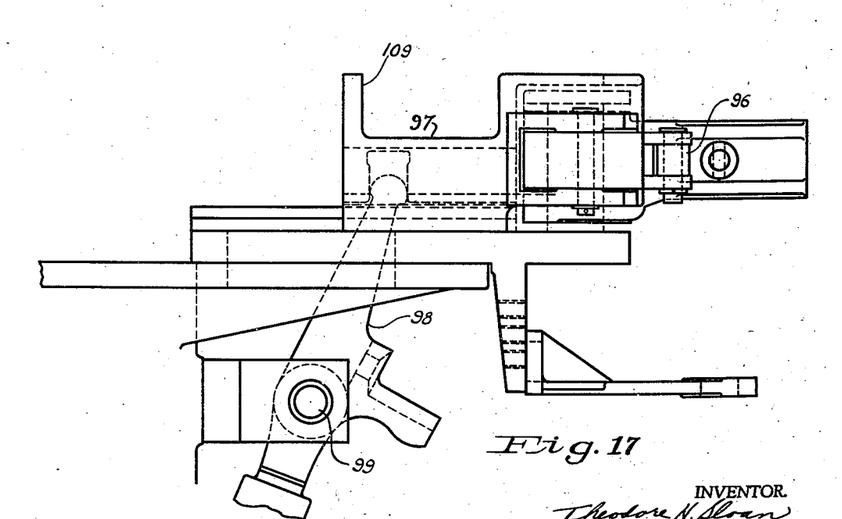
Fig. 17 a view in side elevation of the structure shown in Fig. 16.

The mold operating parts, transfer and the control of the feeding operation will now be described in connection with Figs. 11 to 14 inclusive of the drawings. As illustrated diagrammatically in Fig. 3 the parison and the finish mold tables each have eight molds in octagonal arrangement around their perimeter. The number of stations about the tables correspond to the number of molds but only a part of these stations are employed for performing work on the glassware. The glass is fed to the parison mold, compacted and the neck is formed in the neck mold at station 1 while the mold is inverted. During the indexing period between stations 1 and 2 the mold is reverted. At station 2 the parison mold is again closed at the top by the head 85c operated by the cylinder 85b and at the bottom by the piston 90a operating in the cylinder 91a as shown in Fig. 14 and the parison is blown through the newly formed neck of the parison. Between stations 3 and 4 the parison mold may be partially opened to prevent further chilling of the parison and allow the mass to heat the skin of the parison for the desired length of time depending upon the mass of the parison. Station 5 of the parison mold table is the transfer station and is designated as station 1a of the finish mold table. At this station the parison mold is completely opened, the finish mold is closed around the parison and the neck mold is opened to release the parison to the finish mold. At station 4 the ware may be reheated by partially opening the parison mold and at stations 6, 7 and 8 the parison mold is being closed in preparation for the feeding station 1. Blow heads and finish mold supports are carried by the finishing table for each finish mold. As the molds on the finishing table approach and pass through the successive stations 2a, 3a, 4a, 5a and 6a the ware is continuously blown, and at station 7a the finished piece is removed by a take-out mechanism. Thus the parison is blown immediately after it is received in the finish blow molds and no time is lost in reheating the ware at stations 2a or 3a. The elimination of reheating on the finishing table permits the increase in the speed of operation resulting in greater production. After the ware has been removed from the finish mold the latter remains open as it passes through station 8a and is ready to receive another parison at the transfer station 1a. The blow heads and mold bottom closing devices at stations 1 and 2 are similar.

Figure 11:
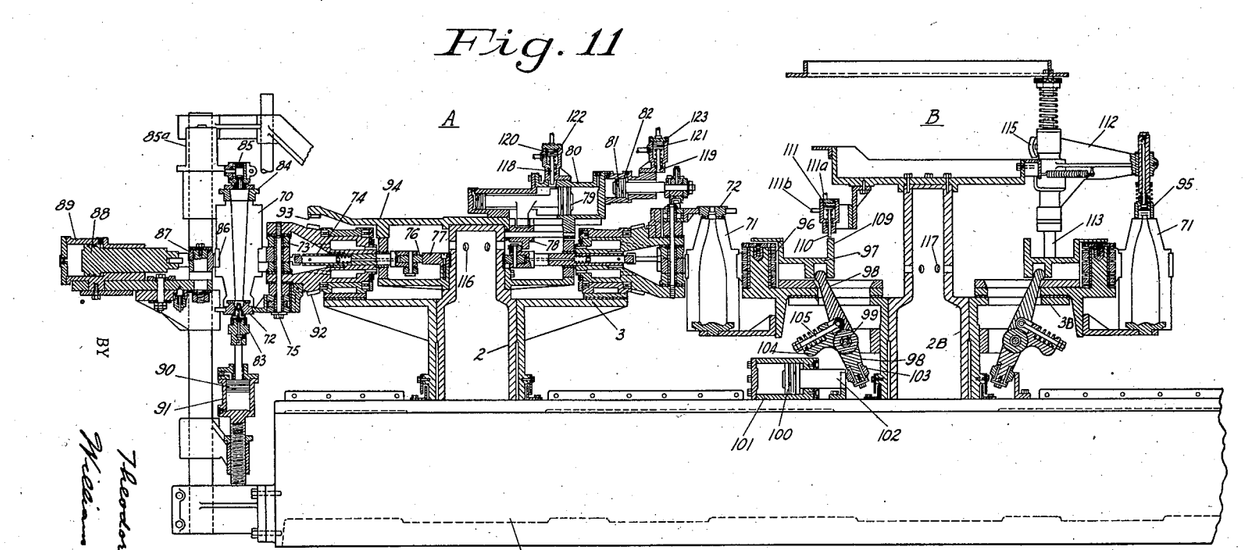
Fig. 11 a vertical cross-section partially in elevation of the ware forming machine.

Referring to Fig. 11 of the drawings, the reference character A generally designates the parison mold table and B the finish blow mold table. The numeral 70 designates a parison mold, the numeral 71 the finish blow molds, and 72 the neck molds.

The parison mold opening and closing mechanism is generally designated by the reference numeral 73 and consists of actuating linkage 74 for swinging the mold sections about their hinge support 75. The actuator 74 carries a cam follower 76 that abuts a cam 77 which operates to close the mold. The parison molds are opened by a slide bracket 78 operated by piston 79 disposed in cylinder 80. The neck rings 72 are opened by piston 81 in cylinder 82, the neck rings being interlocked with the parison molds to close when the parison molds are closed.

At station 1a neck forming plunger 83 extends into the inverted neck ring 72 to form the mouth of the parison preliminary to compacting blowing. A stationary guide bushing 84 is swung into position and cooperates with the inverted bottom of the parison mold 70 to guide the mold charge being fed from the glass feeding mechanism. A compacting blowhead 85 is then positioned in alignment over and engages the guide bushing. Air is then released through the blow head to compact the mold charge to form the parison in the mold 70, air being delivered to the head 85 from cylinder 85a. The parison molds 70 are provided with hangers 86 which are engaged by the mold locking mechanism 87 that is actuated by piston 88 disposed in cylinder 89, the mold locking mechanism being operative during the compressing blow of the parison. The neck forming plunger 83 is actuated by a piston 90 disposed in cylinder 91.

When the parison is formed in the inverted position of the mold 70, as shown in Fig. 11, the parison mold is turned to its upright position by means of gear wheel 92 that engages a gear rack secured to the face 93 of a head block 94, the rack being located at the proper position of the table travel to swing the mold when passing from station 1 to station 2 where the parison is blown in its upright position. When the parison has been formed and delivered to the transfer station, as shown in Fig. 11, the parison mold is opened and the parison remains suspended from the neck ring 72 until the finish blow mold 71 is closed around it. The neck ring is then opened by the piston member 81, hereinbefore described, and a blow-head generally designated by the numeral 95 is subsequently placed upon the mold 71 to close the top of the mold and apply air thereto. The finish mold is opened and closed by means of the hangers 96 which are actuated by a slide 97 engaged by the first of a two part lever 98 pivoted at 99 and operated by piston 100 in cylinder 101, the piston plunger 102 engaging a roller 103 provided on the second part of the lever. The parts of the two part lever 98 are connected through a coil spring which is seated in an extension 104 formed integral with the second part of the lever and the link 105 which is pivotally secured to the first part of the lever. This joint between the two part levers 98 permits movement of the second part of the lever if the first part can not move by reason of the fact that the mold will not close. The extensions 104 also function to open the finish molds by piston actuated plungers 106, as shown in Fig. 12 of the drawings, plungers 106 being actuated by pistons 107 and cylinders 108. The mold actuating slide 97 is provided with an upwardly extending finger 109 which is adapted to abut a plunger 110 actuated by a piston in cylinder 111, the plunger acting as a safety device to prevent indexing of the table if the slide 97 is not in its fully closed position. Cylinder 111 Fig. 11 is connected by conduit 111a to a source of air pressure and if the piston travels downward to clear the port of conduit 111b, which is connected to the declutching cylinder hereinafter described, the air pressure will pass through cylinder 111 to the declutching device. A coil spring returns piston in cylinder 111 when normal indexing conditions are restored.

The continuous blow-head 95 is mounted on an arm 112 that is angularly movable about fixed uprights 113 which are secured to and move with the table 3, the arm 112 being adapted for angular movement to displace the blow-head with the finished mold, both to clear the neck ring 72 at the transfer station and to make the finished article accessible to a take-out mechanism cooperating with the bottom plate 114. The arm 112 is also movable vertically relative to the mold 71 by a roller 115 mounted on the arm 112 and arranged to contact the cam track which is secured to the top of the stationary journal column 2. Vents 116 and 117 are provided in the parison and finish mold table columns to direct cooling air to the molds by its passage radially outward through the openings 116 and 117.

As shown in Fig. 11, the parison mold and neck ring opening mechanisms actuated by pistons 79 and 81 also coact with safety plungers 118 and 119, respectively, which are actuated by pistons 120 and 121 in cylinders 122 and 123, respectively. Like the safety plunger 110, they are adapted to be disposed in the path of travel of pistons 79 and 81 so that if the mold operations are incomplete the index mechanism for rotating the table is rendered inoperative by means of a declutching mechanism 124, Fig. 13, which when actuated opens the main drive clutch 32, thereby stopping the machine. This mechanism employs a lever 125 actuated by plunger 126 in cylinder 127, the manner in which cylinder 127 is connected to the safety devices being diagrammatically illustrated in Fig. 13. Another safety device 128, shown in Fig. 12, is disposed in the path of movement of the finish mold opening slide 97 to insure that the mold is fully opened, to make the ware accessible to the take-out mechanism (not shown). The safety device 128 being actuated by piston 129 in cylinder 130, which is diagrammatically shown in Fig. 13, is likewise connected to the declutching mechanism 124. As shown in Fig. 12, if the slide 97 is not in proper position due to improper closing or opening of the mold, piston 129 goes down by air directed to the top of cylinder 130 and exposes the vent 129a in the side wall of cylinder 130, which is connected to the declutching cylinder 127, Fig. 13, which kicks out clutching lever 125. Since the mold operating mechanism will remain inoperative so long as the clutch is disconnected, normal conditions must be restored. When the air pressure in piston 129 is released, the spring will restore the piston to the upper position, as shown in Fig. 12.

*Valve control mechanism*

The timing of the glass feeding, ware forming and ware transfer mechanisms is coordinated through the master timer, Fig. 6, which carries the cams for actuating the valves that control the application of positive and negative air pressures to the operating cylinders of the various parts, one of said cam control valves being shown in Fig. 3 and designated by the reference numeral 47. By reference to Fig. 13 of the drawings, the controls for the various operations are diagrammatically illustrated and are properly timed through the timing mechanism which, in Fig. 13 of the drawings, is generally designated by the reference character T, each pair of dots designating the ports of the valve cylinders designated by the numerals 48 and 49 in Fig. 3 of the drawings. The lines extending from the dots to the air cylinders represent the air lines through which the cylinder actuating fluids are communicated under control of the master timer to operate the various machine, feeder and transfer elements. In Fig. 13 the numeral 85a designates the compact blow cylinder 85a of Fig. 11 at station 1, 85b the blow-back cylinder shown in Fig. 14 and located at station 2, 89 and 89a the parison mold locking cylinders of stations 1 and 2 respectively, 91 the neck mold plunger cylinder of station 1 shown in Fig. 11, 91a the bottom plate cylinder on end of parison of station 2 shown in Fig. 14, 80 the blank mold opening cylinder and 82 the neck mold opening cylinder shown in Fig. 11. Cylinders 101 and 108 actuate the finish mold closing and opening mechanisms, at stations 1a and 7a respectively. The clutch operating cylinder 127 is controlled by safety cylinders 111, 122, 123 and 130 to which it is shown connected in Fig. 13.

*Operation of parison molds*

In the diagram, Fig. 3, the parison and finish mold tables are marked by arrows as rotating in opposite directions. The various mold stations are designated by numerals 1 to 8 for each table. The parison mold 70 is inverted as shown in Fig. 11 at station marked 1, Fig. 3. In this position the neck mold plunger 83 is introduced into the neck ring 72 by piston 90. The mold is then charged with glass dropped from feeder (not shown) but coordinated by master timer. The compacting blow head 85 at the feeding station then moves in position over parison mold 70 and air is admitted to compact the glass in the mold. The head 85 is then removed from over the parison mold and plunger 83 withdrawn from neck mold 72 at the same time.

The Geneva drive then functions to index the mold 70 to station 2 and during this travel the mold 70 is turned 180° by gear wheel 92 contacting the segment rack on frame 93. At station 2, a bottom plate 70a is raised by piston 90a in cylinder 91a to close the bottom of the parison mold 70. The next operation is lowering the blow head 85c by air in the blow-back cylinder 85b which automatically turns on blowing air to blow out parison to fill mold 70, the blow head being then raised from the mold.

The bottom plate is then dropped away from the mold and the machine is again indexed to bring the parison to station 3. No operation is effected at station 3 but when the table next indexes to station 4, the mold is partially open by action of cam 77 to prevent further chilling of the enamel on the outside of the parison and to permit the enamel to be reheated for further expansion in the finish blow operation.

Nothing transpires between stations 4 and 5. At station 5, blank mold 70 is opened wide by cylinder 80 leaving the parison or glass blank suspended from neck ring 72. Blow mold 71 closes around the blank, and neck ring 72 is opened by cylinder 82.

Between stations 5 and 6 the blank and neck molds begin to close, and at station 7 they are half closed. Between stations 7 and 8 the mold is inverted and closed and the blank forming operation repeated.

*Operation of finish blow table*

The blank is received at station 1a corresponding to station 5 of the blank mold by closing the finish mold 71 around the blank with cylinder 101. The bottom plate is always in position and interlocks with mold 71 when closed. When indexing mold from stations 1a to 2a, the blow head 95 is in position and blowing air is supplied to mold 71. The blowing pressure may be continued while mold travels through stations 2a to 6a inclusive, and partially to station 7a. At station 7a, the mold is opened and the bottle is supported on the bottom plate. This is the take-out position where the bottle is removed from the machine and placed on a conveniently located conveyor.

It is evident from the foregoing description of the invention that the double Geneva drive assures absolute alignment of the neck ring with finishing mold when brought in superposed relation, thereby preventing bending or cracking of the bottle necks. The double Geneva drive also reduces mechanical stress on the machine and the velocity of the indexing movements, the latter eliminating the tendency of the parison to swing in the blow mold, which would result in uneven distribution of the bottom portion of the finished ware.

By means of the safety devices for declutching the drive when, for any reason, the mold opening and closing operations are interfered with, the machine operating parts are fully protected and loss of production time is reduced.

The use of the targets in effecting synchronization of the feeder and machine drives is advantageous in reducing the time for effecting adjustments otherwise necessary, and by means of the targets such adjustments between the glass feeding and mold forming operations as may be necessary can be speedily effected. Also it is possible to operate the feeder only, or the machine only, or the two combined.

Although one embodiment of the invention has been herein illustrated and described, it will be evident to those skilled in the art that various modifications may be made in the details of construction without departing from the principles herein set forth.

I claim:

1. In a ware forming mechanism, the combination of a glass fabricating machine comprising a rotary table structure having thereon an annular series of molds, a mechanical drive for rotating the table structure in a step-by-step motion made up of dwell and index periods to bring the molds in turn into feeding and fabricating stations, a drive shaft arranged to operate the mechanical drive, a second drive shaft arranged to operate a glass feeding mechanism for supplying charges of molten glass to the molds as the latter are presented thereto, a motor, a clutch on each of said shafts, means connecting the motor to the clutches to continuously rotate the latter, said clutches being arranged to independently connect the shafts for rotation by said motor, and means to inversely change the dwell and index periods of the table structure motion independently of the speed of the drive shafts to suit the particular character of ware being formed.

2. In a ware forming mechanism, the combination of a glass fabricating machine comprising a rotary table structure having thereon an annular series of molds, a mechanical drive for rotating the table structure in a step-by-step motion made up of dwell and index periods to bring the molds in turn into feeding and fabricating stations, a drive shaft arranged to operate the mechanical drive, a second drive shaft arranged to operate a glass feeding mechanism for supplying charges of molten glass to the molds as the latter are presented thereto, a motor, a clutch on each of said shafts, means connecting the motor to the clutches to continuously rotate the latter, said clutches being arranged to independently connect the shafts for rotation by said motor, means for selectively actuating one of said clutches to synchronize the operation of the table structure through the drive shafts, and means to inversely change the dwell and index periods of the table structure motion independently of the synchronized shafts to suit the particular character of ware being formed.

3. In a ware forming mechanism, the combination of a glass fabricating machine comprising a rotary table structure having thereon an annular series of molds arranged to be presented in turn to feeding and fabricating stations, a drive shaft arranged to rotate the table structure, a second drive shaft arranged to operate a glass feeding mechanism for supplying charges of molten glass to the molds as the latter are presented thereto, a clutch part rotatably mounted on each of said drive shafts, a motor arranged to rotate one of said clutch parts, gear mechanism interposed between said clutch parts causing the latter to rotate in unison, a complementary clutch part connected to each of said drive shafts and arranged for longitudinal movement on their respective shafts to engage and disengage the corresponding of the first mentioned clutch parts to selectively rotate said shafts either in unison or independently of each other.

4. In a ware forming mechanism, the combination of a glass fabricating machine comprising a rotary table structure having thereon an annular series of molds arranged to be presented in turn to feeding and fabricating stations, a drive shaft arranged to rotate the table structure, a second drive shaft arranged to operate a glass feeding mechanism for supplying charges of molten glass to the molds as the latter are presented thereto, a motor, a clutch on each of said shafts, means connecting the motor to the clutches to continuously rotate the latter, said clutches being arranged to independently connect the shafts for rotation by said motor, a pair of targets rotatably supported adjacent one another in axial alignment, means for rotating one target from the first shaft and the other target from the second shaft in timed relation with their respective rotation, and markers on the targets to indicate the synchronous relation of the machine and the feeder drive when both clutches are in operative engagement.

5. The structure of claim 4 which includes means for slipping the clutch of the first drive shaft to position the markers in synchronism.

6. The structure of claim 4 which includes means for selectively engaging and disengaging one clutch while the other clutch is in engagement to bring the markers on the targets in alignment whereby the operating cycles of the machine and feeder are synchronized.

7. In a ware forming machine, the combination of a rotary table, molds arranged in an annular series on the table, a mechanical drive for a glass feeding mechanism which feeds charges of glass to the molds as the latter are presented thereto, means for fabricating the glass charges in the molds, a mechanical drive for rotating the table in a step-by-step motion made up of dwell and index periods to bring the molds in turn into feeding and fabricating stations, a motor for operating both of said drives, a clutch interposed between each of said drives and said motor to independently connect them for rotation by the motor, and means for varying the mechanical drive of the table to inversely change the dwell and index periods of the step-by-step motion for the fabricating operations independently of the feeder drive to suit the particular character of ware being formed.

8. In a ware forming machine, the combination of a pair of rotary tables each having thereon an annularly arranged series of molds, a mechanical drive means for operating a glass feeding mechanism for feeding charges of molten glass to the molds on one of said tables as the molds are presented thereto, means for compacting and blowing the charges of glass fed to the molds of the first table, means for transferring the said compacted and blown charges from the molds on the first table to the molds on the second table, means for continuously blowing the glass in the molds on the second table during a portion of their travel, mechanical drive means for rotating said tables by a step-by-step motion made up of dwell and index periods to bring the molds into feeding, compacting and blowing positions, a motor arranged to operate both of said drive means, a clutch interposed between each of said drive means and said motor to independently connect them for rotation by the motor, and means for varying the mechanical drive means for rotating said tables to inversely change the dwell and index periods of the step-by-step motion of the molds in the blowing position on the second table independently of the feeder drive to suit the particular character of ware fabricated.

9. In a ware forming machine, the combination of a pair of rotatable tables, a circular series of blank mold means on the first table and a circular series of finish mold means on the second table, means for partially fabricating a series of articles of glass in the blank mold means on the first table, said mold means arranged for transferring partially fabricated articles from the mold means of the first table to the mold means of the second table, means for completing the fabrication of such articles in the finish mold means on the second table immediately after the transfer of the glass charge thereto, an individual Geneva drive mechanism for intermittently rotating each of said tables to positively index the tables and lock the mold means of both tables in cooperative alignment at the transfer position, a common drive shaft for operating both of said Geneva drive mechanisms, a second drive shaft arranged to operate a glass feeding mechanism to supply charges of plastic glass to the mold means of the first table as they are presented thereto, clutch parts on each of said drive shafts, a pair of rotatable clutch parts complementary respectively to the first named clutch parts, and means for continuously driving the rotatable clutch parts, the complementary clutch parts arranged to independently connect the drive shafts for rotation.

THEODORE H. SLOAN.